ARRANGEMENT FOR STORING AND SCANNING INFORMATION IN FERRITE-CORE STORAGE DEVICES

Filed Sept. 27, 1961 2 Sheets-Sheet 1

INVENTOR.

BY F. ULRICH

ATTORNEY:

United States Patent Office 3,204,226

Patented Aug. 31, 1965

3,204,226

ARRANGEMENT FOR STORING AND SCANNING INFORMATION IN FERRITE-CORE STORAGE DEVICES

Friedrich Ulrich, Stuttgart-Bad Cannstatt, Germany, assignor to International Standard Electric Corporation, New York, N.Y., a corporation of Delaware Filed Sept. 27, 1961, Ser. No. 141,121

Claims priority, application Germany, Oct. 4, 1960, St 16,970

11 Claims. (Cl. 340—174)

Figure 1:
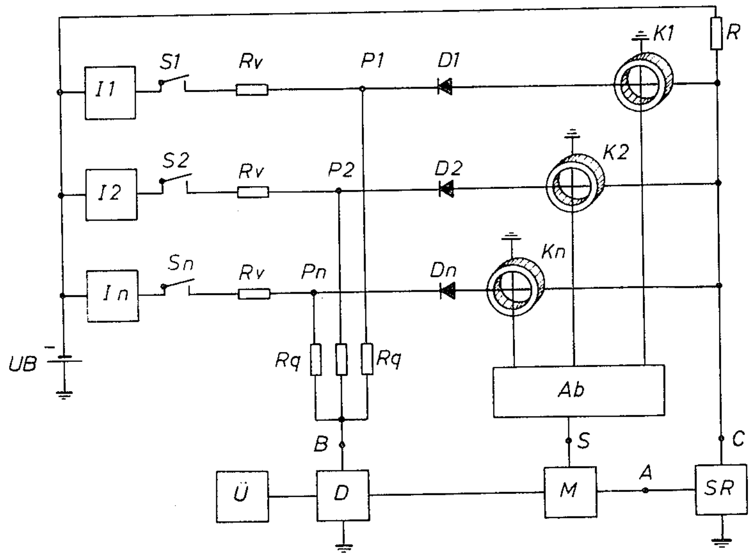

This invention relates to arrangements for storing and scanning information in ferrite-core storage devices comprising means for separately marking and interrogating leads, as well as for preventing double detections of markings.

At various points in telephone switching systems, a number of lines are continuously interrogated in a cyclical order of succession for detecting incoming pulses, such as counting pulses on the counting wires assigned to the subscriber. If there is no demand for an immediate identification of a pulse, and if it is sufficient to evaluate an impulse prior to the arrival of a possible further pulse on the same line, ferrite-core storage devices are particularly suitable for being used as intermediate storages.

As a bistable storage element a ferrite core with a rectangular hysteresis loop is assigned to each line to be supervised. In order that the investment in controlling and connecting-through devices can be kept as small as possible with respect to the scanning operation these cores are preferably interconnected to provide one or more matrices. The lines to be supervised are connected to the marking windings of the associated cores. In this way, if a core is changed from it "0"-state to the "1"-state, then this state is maintained until, by a coordinate call-up of this core during the scanning operation, the core is reset to the state "0" by the reading pulse.

Through all of the cores there is threaded a reading loop wire in which a voltage pulse is induced which provides information regarding the state of the interrogated core. If the indicator connected to the reading wire, responds during the interrogation of a core, then this proves that the respective core was in the marked state "1." Accordingly, one charge unit has to be registered in the name of this particular subscriber. If the indicator does not respond during the scanning operation, then the core was in the non-marked state "0." Accordingly, no counting pulse is registered.

If the interrogation coincides with a counting pulse, then the energizations of the core temporarily annul each other for the time duration of the scanning operation. For this reason the core will remain in the marked state, and is only read and reset in the course of the next interrogation. On account of the storage effect of the ferrite cores it is sufficient if each core is only scanned once during an interval which is shorter than the shortest time interval between two counting pulses on one line.

This method of storing and scanning, above all, causes a substantial reduction of the scanning speed as where the counting pulses are scanned directly, that is, without an intermediate storing. In this case the scanning cycle has to be adapted to the shortest counting pulse. Due to the reduced scanning speed it is possible to use more simple types of recording devices for registering the charge information.

The method of parallel storing and scanning of a ferrite-core storage device, however, has the disadvantage that the storing which is effected at a random time position, is likely to disturb the cyclical scanning operation, because also during the storing operation a voltage is induced in the common reading wire. By the timely coincidence between a marking process and a process of scanning a marked core it is possible that, in the reading wire, the induced voltages annul each other, which may easily lead to a loss of information. This disadvantage can only be eliminated if both the storing and the scanning operations are performed separately with respect to time. In the conventional types of methods, however, this cannot be done, because the counting pulses arrive at random time positions.

If a ferrite-core storage device is used (e.g. for the message-accounting purpose in telephone switching systems which still employ electromechanical switching means), further difficulties will arise with respect to the conventional types of storing and scanning methods. The production of counting pulses, that is, of the marking potentials, by electromechanical switching means is often entailed by contact-bouncing phenomena. In the course of this the counting pulse is split up into several partial pulses, all of which are long enough to mark the core. If now an interrogating pulse meets upon a marking pulse (i.e. between two partial pulses thereof), it is likely that the core, after the effected evaluation and resetting, is marked again, and will erroneously, in the course of the next interrogation produce a reading signal, that is, a charge pulse.

Various methods have already become known for reliably avoiding such double countings. All of these methods are based on a timely discrimination in dependence upon the maximum possible train of pulses on the line. To this end it is known to use two ferrite-core storage devices of a similar type. One ferrite-core storage device is assigned to the counting wires of the subscribers to be supervised, and is adapted to receive the incoming counting pulses. During the scanning of this storage device the read-out information is not only transferred to the centralized recording equipment, but is also taken over by a second auxiliary storage device which is synchronously stepped on. During the now effected scanning of the same core, a read-out charge information is only transferred to the recording equipment if, in the course of the preceding scanning operation, there had not been effected a marking, and, consequently, also no recording of the information into the auxiliary storage device. Since the scanning cycle of the ferrite store is chosen so that a certain core is scanned during a period of time which is shorter than the shortest time interval between two counting pulses on one line, a double counting of charge pulses is rendered impossible.

However, this fast scanning method is still not safe with respect to noise pulses likely to appear on the marking leads. These noise pulses may be applied to the marking leads either capacitively or inductively. Since these noise pulses may be applied at random time positions, and also to marking leads which are not adapted to transfer the charge pulses, this noise-pulse application may easily lead to faulty counting operations. In the case of low-ohmic input circuits of the marking leads, these pulses can easily be trapped, with the aid of relatively small by-path capacitors if such pulses are short enough. In the case of switching systems which employ electromechanical switching means, there appear substantially longer and more powerful noise pulses. A filtering of such noise pulses would, in the case of the low-ohmic marking inputs, cause a considerable additional expenditure for the ferrite-core storage devices, because each individual marking lead would have to be provided with the corresponding filtering means.

The present invention provides an arrangement for storing and scanning information in a ferrite-core storage device comprising facilities for preventing double detections of markings. The influences caused by noise pulses are either completely avoided or reduced to a negligible extent. In order to eliminate the effects of the noise pulses almost completely, all of the lines to be supervised are normally separated from the ferrite-core storage device, and are supervised by a common detector circuit, with respect to the presence of markings.

The marking leads of the ferrite-core storage device are momentarily connected for receiving the markings only in the presence of one or more marking potentials which occur after a predetermined period of time. The scanning operation performed by the ferrite-core storage device is stopped only during this marking time. The advance time, after the response of the detector circuit, is longer than the duration of the noise pulses. If the common detector device receives a marking potential which lasts for a period of time longer than specially adapted or control intervals of time, the reception of marking potentials for the ferrite-core storage device are interrupted repeatedly. However, if the central detector circuit does not drop off during a predetermined period of time, an alarm is tripped via an alarm device.

The invention can also be arranged so that both the scanning device and the storing device are coupled to one another for storing the marking between two steps of the scanning operation.

A circuit arrangement for carrying out this invention proposes that all of the lines to be supervised are connected, via series resistors, to a common detector circuit for controlling a multivibrator circuit which, after a predetermined period of time, temporarily operates a control switch by which the marking leads of the ferrite-core storage device that are connected to the lines to be supervised via rectifiers and series resistors, are applied from the one potential to the other potential of the source of marking potential.

Figure 2:
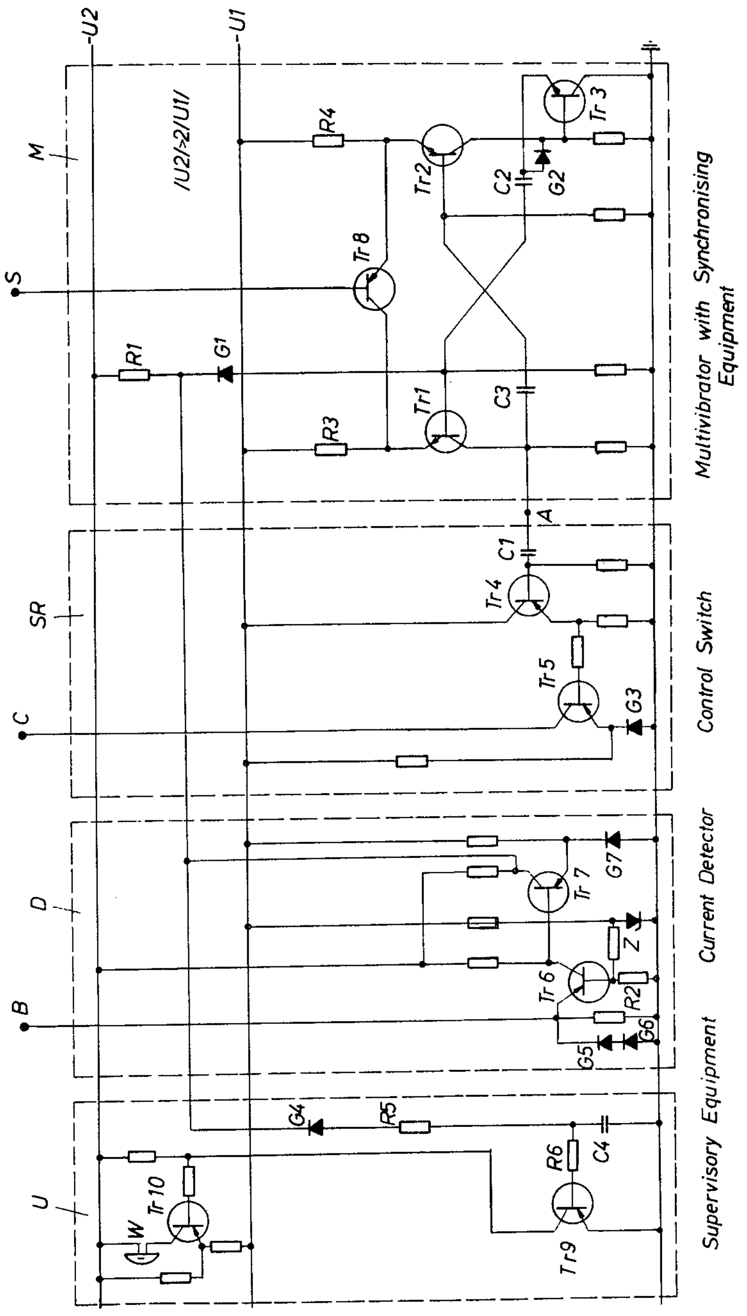

The above mentioned and other features of this invention and the manner of obtaining them will become more apparent, and the invention itself will be best understood by reference to the following description of an embodiment of the invention taken in conjunction with the accompanying drawings, in which:

FIGS. 1 and 2 of the accompanying drawings, in which:

FIG. 1, on principle, shows the storing and scanning of a ferrite-core storage device according to the invention; and FIG. 2 shows details of the associated control arrangements.

FIG. 1 shows the cores K1, K2 . . . K*n* of a ferrite-core storage device. All of the scanning windings of the cores, shown as scanning wires, are led to the scanning device A*b*. To each line to be supervised comprising a pulse generator I1, I2 . . . I*n*, there is assigned one individual core. If a marking has not been effected, that is, of al contacts *s*1 . . . *sn* of the pulse generators are open, then this shows that the current-detector circuit D has not responded and the control switch SR has not been operated. Ground potential is applied to points P1 . . . P*n* and, consequently, also to the cathodes of the rectifiers D1 . . . D*n*. Via the resistor R and the individual marking leads of the ferrite-core storage device the anodes of the rectifiers D1 . . . D*n* are applied to minus potential of the source of the marking voltage UB. Accordingly, all of the rectifiers are blocked.

In the case of a marking effected by the minus potential of the marking voltage, the contact *s*1 (for example) of the pulse generator I1 is then closed. A current will now flow from the minus pole of the source of marking voltage via the pulse generator 11, the closed contact *s*1, and the series resistors R*v* and R*q* to the current-detector D provided in common to all marking leads. As long as the control switch SR is not actuated, the rectifiers D1 . . . D*n* remain blocked via the resistor R and the individual marking leads of the ferrite-core storage device, although the potential at point P1 has become more negative.

If a current now flows through the current-detector circuit D the latter will respond and will switch on an asymmetrical multivibrator M by which, after a period of time which is determined by this multivibrator, the control switch SR is temporarily actuated. For the time duration of this actuation of switch SR the other potential (ground) of the source of marking voltage is applied to all marking leads of the ferrite-core storage device.

Since the switch S1 is closed, core K1 can now also be marked via the rectifier D1 which is now biased in the forward direction. The marking leads S2 . . . S*n* which are not connected through, are not affected thereby provided that the voltage drop appearing at the current-detector circuit D is kept very small. In a most simple manner this can be accomplished by using as a detector circuit a transistor circuit which only responds to a certain current value, and which prevents the voltage drop at the input from exceeding a predetermined value, independently of the further rise of current.

In the arrangement of the matrix as shown in FIG. 1 the resistors R*q* in the individual marking circuits may also be laid out differently. In some cases of practical application of such a storage arrangement there is required a different kind of return indication to the pulse generator. This requirement is then met in a simple way by differently dimensioning the values of the resistors R*q*. The electromechanical switching means contained in the pulse generator will then only respond to the current as determined by the series resistors R*v* and R*q*. The increase in current appearing during the very short-timed marking of the ferrite cores, is not registered by the more slow-acting electromechanical switching means of the pulse generator. The current for marking the cores may thus be independent of the resistance value of resistor R*q*, and is substantially only limited by the series resistance R*v*. Regardless of static current values in the marking circuits, it is therefore possible to provide one uniform marking winding for all cores of the storages.

In the presence of a marking and in the still open condition of switch SR, the blocking currents of the rectifiers D2 . . . D*n* are prevented from having an influence upon the signal-conducting branch including the core K1. Care must only be taken that the voltage drop across resistor R, caused by the blocking currents of the rectifiers, will not exceed the value of the greatest voltage drop appearing at a series resistor R*v* during the marking.

The multivibrator M in the control arrangement is provided with a synchronizing input D connected to the scanning device A*b*. Thus, during the time of marking the ferrite-core storage device, the latter is not being scanned simultaneously. In the course of this the scanning cycle can be stopped momentarily, or the marking is only carried out during the interval between two steps of the scanning operation. The possibility of a probable influence of noise is thus restricted to the very short time of marking the ferrite-core storage device. Due to the independence of these events the influence will be negligibly small.

FIG. 2 shows details of the arrangements necessary to control the storing of the information. The points of transfer A, B, C and S correspond to those of FIG. 1. The current-detector D serves to indicate the marking potential on any random line (lead). This detector arrangement has to be designed in such a way as to respond from a certain current value onwards. The value of the current is determined by the smallest marking current of a line.

In order to prevent the voltage drop at the detector arrangement, in the case of a multiple marking, from becoming too great, the input resistance has to decrease as the current increases. The value of the maximum admissible voltage drop is determined by the fact that upon connecting-through of the marking leads of the ferrite-core storage device, no faulty marking of cores is effected thereby. The transistor T*r*6 of the detector is unblocked when in its normal condition and, consequently, the subsequently arranged transistor Tr7 is blocked. As long as this condition exists the capacitor C4 is charged via the resistors R1 and R5, as well as via the rectifier G4, and via the resistor R6 the transistor Tr9 is unblocked (or rendered conducting). The input circuit of transistor Tr10 is blocked and, consequently, the electric bell W is disconnected. At the same time, via the resistor R1 and the rectifier G1, the base electrode of transistor Tr1 is blocked and, consequently, the multivibrator is blocked as soon as the transistor Tr2 is in its conducting state.

Transistor Tr6 of the detector is unblocked by a portion of a voltage stabilized by a Zener diode Z, and is only blocked if, across the resistor R2, there appears an equally high voltage drop which is caused by the marking currents arriving via the control lead B. Since the total marking current may also assume great values, two series-connected silicon power diodes are connected in parallel to the resistor R2. In this way it is safeguarded that the voltage applied to the input of the detector circuit is prevented from assuming a too high value.

Upon blocking of the transistor Tr6 the subsequently arranged transistor Tr7 becomes unblocked. The charging of the capacitor C4 is interrupted, and the multivibrator is unblocked. The capacitor C4 now starts to discharge via the resistor R6 and the control circuit of transistor Tr9.

If the transistor Tr7 remains unblocked for a sufficient period of time the capacitor has discharged, and the transistor Tr9 turns "off." In this way the controlling transistor Tr10 is turned "on," and an alarm is sounded by the electric bell W. This supervisory arrangement serves to draw the attention of the maintenance personnel in the case of any probably existing faulty permanent or continuous marking. The time constant of the supervisory circuit is to be chosen greater than the greatest marking time appearing during peak traffic hours. The rectifier G4 arranged in the lead-in conductor of the supervisory arrangement, is adapted to prevent the capacitor C4 from being discharged via the unblocked transistor Tr7. The function of the system, however, is not disturbed during the time in which the alarm is sounded.

The multivibrator is reset by the change in potential at the connecting point between the resistor R1 and the rectifier G1. The charged capacitor C2 starts to discharge and, on account of this, the stage comprising the transistor Tr1 becomes conducting after a certain lapse of time. At point A, therefore, a negative potential will appear. The coupling capacitor C1, upon the appearance of the pulse, will produce a differentiated impulse, by the length or duration of which there is determined the conducting state of the control switch SR.

The transistor Tr4 is controlled by the charging current of the capacitor C1. Consequently, the transistor Tr5 of the control switch SR is also controlled by current from capacitor C1, thus applying the marking leads connected to the points C of the ferrite-core storage device, to the other potential (ground) of the source of marking voltage UB. Accordingly, the storing of the markings is only effected during the short time in which the transistor Tr5 is unblocked. If the transistor Tr7 of the detector remains unblocked, then the multivibrator swings back and the control switch is operated again after a predetermined period of time. This is repeated until the detector switches back, that is, until no further marking pulse is applied.

The repeated marking of a core will not lead to a faulty detection, because this is excluded by the arrangement which serves to prevent the double detection. For example, if a long lasting marking pulse is applied to a line for a period of time which exceeds a control interval, and if the respective core is read after the first marking operation, then the core can be marked again. In the course of the next successive scanning operation, however, this marking is detected as belonging to the preceding marking pulse, because the scanning cycle is chosen so that a core is already read earlier, i.e. before a further marking pulse can arrive. Since the capacitor C2 in the multivibrator circuit has a much greater capacity than the capacitor C3, the stage Tr1 of the multivibrator will be triggered back much quicker. Since the voltage U2 is higher than 2, U1, the time delay for the first marking process, will be somewhat greater than the time intervals between two successively following markings in the case of an unblocked multivibrator.

In addition thereto the multivibrator circuit is provided with a synchronizing input which, via the control lead S, is connected to the scanning device A*b*. The synchronizing arrangement is composed of the resistors R3 and R4, as well as of the transistor Tr8. Via this arrangement it can be achieved that the trigger process of the multivibrator is coupled in such a way to the scanning cycle that there is effected either a writing into the ferrite-core storage device (multivibrator released), or a reading-out of the ferrite-core storage device (multivibrator blocked).

The invention has been explained herein with reference to the example of a message-accounting arrangement. The described storing and scanning information in a ferrite-core storage device, however, can be applied in just the same advantageous manner to other types of identifying and storing arrangements without thereby exceeding the scope of the invention.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A magnetic core memory device comprising means for storing data information in said core memory device responsive to electrical conditions occurring on any of a plurality of lines, said lines normally being separated from said device, means comprising a plurality of scanning leads associated with said lines for normally scanning said device cyclically to detect the storage of said data, common detector means for detecting an occurrence of said electrical conditions on any of said lines, means responsive to the detection of said condition and effective after a period of time following the detection for temporarily connecting a line marked with said condition to said device, and means for stopping said scanner during the interval while said temporary connection is maintained to prevent mutilation of said stored information by signals from said scanning means.

2. The device of claim 1 wherein said period of time lasts longer than noise conditions occurring on said lines which noise simulates said electrical conditions.

3. The device of claim 1 and means whereby said marking and scanning means are synchronized so that said storage occurs between two succesive scanning cycles.

4. The device of claim 1 and means for interrupting the connections of a marked line with said device during control time intervals if said detector means indicates an excessively long lasting one said marking which continues for a period of time which is longer than said control time intervals.

5. The device of claim 1 and means for giving an alarm signal if said detector means detects said condition continuing on said line for more than a predetermined period of time.

6. The device of claim 1 wherein said electrical conditions normally last during no more than a definite period of time and do not recur in less than a fixed period of time, and means whereby said scanning means normally runs through fixed cycles, said cycle being longer than said definite period of time and shorter than said fixed period of time.

7. The device of claim 1 wherein each of said lines is connected to said common detector circuit via series resistors, a multivibrator device controlled via said resistors for measuring a predetermined period of time, means for momentarily actuating a control switch to connect the storage leads of the device to the lines to be supervised via a corresponding one of the series of resistors.

8. The device of claim 7 wherein said detector means comprises a transistor circuit which only responds to an input signal exceeding a certain current value, and which prevents the voltage drop at the input from exceeding a predetermined value responsive to a further current rise.

9. The device of claim 8 wherein the output of the multivibrator is connected via a capacitor to control said control switch.

10. The device of claim 9 wherein said multivibrator is provided with an input for establishing a synchronization with said scanning means.

11. The device of claim 10 wherein the operating time of said detector means is supervised by a supervisory means which sends an alarm as soon as this operating time reaches a predetermined value.

References Cited by the Examiner

UNITED STATES PATENTS 3,036,293 5/62 Vester ---------------- 340—174

IRVING L. SRAGOW, *Primary Examiner.*